(12) United States Patent
Harstad et al.

(10) Patent No.: US 6,543,985 B1
(45) Date of Patent: Apr. 8, 2003

(54) SNOWMOBILE LOADING SYSTEM

(76) Inventors: Stanley A. Harstad, 201 Hanover, Herman, MN (US) 56248-0164; Konnie K. Harstad, P.O. Box 164, Herman, MN (US) 56248-0164

( * ) Notice: Subject to any disclaimer, the term of this patent is extended or adjusted under 35 U.S.C. 154(b) by 0 days.

(21) Appl. No.: 10/033,309

(22) Filed: Oct. 23, 2001

(51) Int. Cl.[7] .......................... B65G 67/02; B65G 69/28
(52) U.S. Cl. ..................................................... 414/537
(58) Field of Search .................................. 414/537, 538

(56) References Cited

U.S. PATENT DOCUMENTS

| | | | | |
|---|---|---|---|---|
| 3,687,314 A | * | 8/1972 | Haugland | 414/537 |
| 5,622,299 A | * | 4/1997 | Berard | 224/403 |
| 5,853,281 A | * | 12/1998 | Farmer | 414/537 |
| 6,089,816 A | * | 7/2000 | Christ | 414/538 |

* cited by examiner

Primary Examiner—Steven A. Bratlie (57) ABSTRACT

A snowmobile loading system for conveniently loading and unloading a snowmobile onto a trailer or pickup. The snowmobile loading system includes an elongate frame, a plurality of rollers rotatably positioned within the elongate frame traverse to a longitudinal axis of the elongate frame, a locking plate positioned within the elongate frame, a spring for applying a force upon the locking plate, and a locking pin selectively extendible within an aperture within the elongate frame for retaining the locking plate in a closed position. When an individual desires to load a snowmobile upon a bed of a trailer or vehicle, the user positions each ski with respect to a corresponding loading ramp and, then drives the snowmobile forwardly wherein the skis movably engage the rollers. When the ski engages the locking plate, the locking plate is pivoted downwardly thereby compressing the spring. When the ski passes over the locking plate the spring forces the locking plate upwardly to prevent the ski and snowmobile from accidentally falling rearwardly. To unload the snowmobile, the user lowers the locking plate and secures with the locking pin thereby allowing the snowmobile to be withdrawn from the trailer or vehicle.

20 Claims, 7 Drawing Sheets

SNOWMOBILE LOADING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to vehicle loading ramps and more specifically it relates to a snowmobile loading system for conveniently loading and unloading a snowmobile onto a trailer or pickup.

2. Description of the Prior Art

Trailers for snowmobiles and similar vehicles have been in use for years. There are various styles of trailers utilized and numerous methods of loading a snowmobile upon the trailer. For example, some snowmobile trailers pivot about the axle thereof for allowing the user to directly drive the snowmobile upon the trailer without the usage of a loading ramp. However, these types of trailers are difficult to maneuver the snowmobile upon since the wear blades beneath the skis often times catch upon the wooden platform making it difficult to load or unload the snowmobile from the trailer.

Other types of trailers require the usage of a loading ramp to the main platform of the trailer. It is sometimes difficult to drive the snowmobile upon the loading ramp. It is also sometimes difficult to maneuver the snowmobile upon the main platform of the trailer which is typically constructed of wood since the wear blades beneath the skis often times catch upon thereof.

A further type of trailer is simply the usage of a bed of a pickup or similar vehicle to receive the snowmobile. Again, ramps or other structures are required to load the snowmobile upon the pickup. Sometimes several individuals will attempt to physically lift the snowmobile into the bed of the pickup.

While these devices may be suitable for the particular purpose to which they address, they are not as suitable for conveniently loading and unloading a snowmobile onto a trailer or pickup. Conventional trailers are difficult to load and unload a snowmobile from thereof often times requiring more than one person to assist with the loading and unloading of a snowmobile.

In these respects, the snowmobile loading system according to the present invention substantially departs from the conventional concepts and designs of the prior art, and in so doing provides an apparatus primarily developed for the purpose of conveniently loading and unloading a snowmobile onto a trailer or pickup.

SUMMARY OF THE INVENTION

In view of the foregoing disadvantages inherent in the known types of snowmobiles now present in the prior art, the present invention provides a new snowmobile loading system construction wherein the same can be utilized for conveniently loading and unloading a snowmobile onto a trailer or pickup.

The general purpose of the present invention, which will be described subsequently in greater detail, is to provide a new snowmobile loading system that has many of the advantages of the snowmobile trailers mentioned heretofore and many novel features that result in a new snowmobile loading system which is not anticipated, rendered obvious, suggested, or even implied by any of the prior art trailers, either alone or in any combination thereof.

To attain this, the present invention generally comprises an elongate frame, a plurality of rollers rotatably positioned within the elongate frame traverse to a longitudinal axis of the elongate frame, a locking plate positioned within the elongate frame, a spring for applying a force upon the locking plate, and a locking pin selectively extendible within an aperture within the elongate frame for retaining the locking plate in a closed position. When an individual desires to load a snowmobile upon a bed of a trailer or vehicle, the user positions each ski with respect to a corresponding loading ramp and then drives the snowmobile forwardly wherein the skis movably engage the rollers When the ski engages the locking plate, the locking plate is pivoted downwardly thereby compressing the spring. When the ski passes over the locking plate the spring forces the flocking plate upwardly to prevent the ski and snowmobile from accidentally falling rearwardly. To unload the snowmobile, the user lowers the locking plate and secures with the locking pin thereby allowing the snowmobile to be withdrawn from the trailer or vehicle.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a snowmobile loading system that will overcome the shortcomings of the prior art devices.

A second object is to provide a snowmobile loading system for conveniently loading and unloading a snowmobile onto a trailer or pickup.

Another object is to provide a snowmobile loading system that does not require the assistance of another individual during the loading and unloading of a snowmobile.

An additional object is to provide a snowmobile loading system that reduces the required physical assertion by an individual loading or unloading a snowmobile.

A further object is to provide a snowmobile loading system that reduces the amount of time required to load and unload a snowmobile.

Another object is to provide a snowmobile loading system that fits upon various sizes and types of trailers and vehicles.

A further object is to provide a snowmobile loading system that reduces wearing upon a snowmobile trailer.

Another object is to provide a snowmobile loading system that reduces the wearing upon the wear blades of a snowmobile ski.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the, drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Even though the present invention is preferably utilized within multiple units thereof, the discussion of the present invention will be comprised of a single unit wherein it will be appreciated that multiple units will be utilized in various manners. Turning now descriptively to the drawings, in which similar reference characters denote similar elements throughout the several views, FIGS. 1 through 7 illustrate a snowmobile loading system 10, which comprises an elongate frame 20, a plurality of rollers 30 rotatably positioned within the elongate frame 20 traverse to a longitudinal axis of the elongate frame 20, a locking plate 40 positioned within the elongate frame 20, a spring 42 for applying a force upon the locking plate 40, and a locking pin 44 selectively extendible within an aperture 46 within the elongate frame 20 for retaining the locking plate 40 in a closed position. When an individual desires to load a snowmobile upon a bed 14 of a trailer 12 or vehicle, the user positions each ski 16 with respect to a corresponding loading ramp and then drives the snowmobile forwardly wherein the skis 16 movably engage the rollers 30. When the ski 16 engages the locking plate 40, the locking plate 40 is pivoted downwardly thereby compressing the spring 42. When the ski 16 passes over the locking plate 40 the spring 42 forces the locking plate 40 upwardly to prevent the ski 16 and snowmobile from accidentally falling rearwardly. To unload the snowmobile, the user lowers the locking plate 40 and secures with the locking pin 44 thereby allowing the snowmobile to be withdrawn from the trailer 12 or vehicle.

Figure 1:
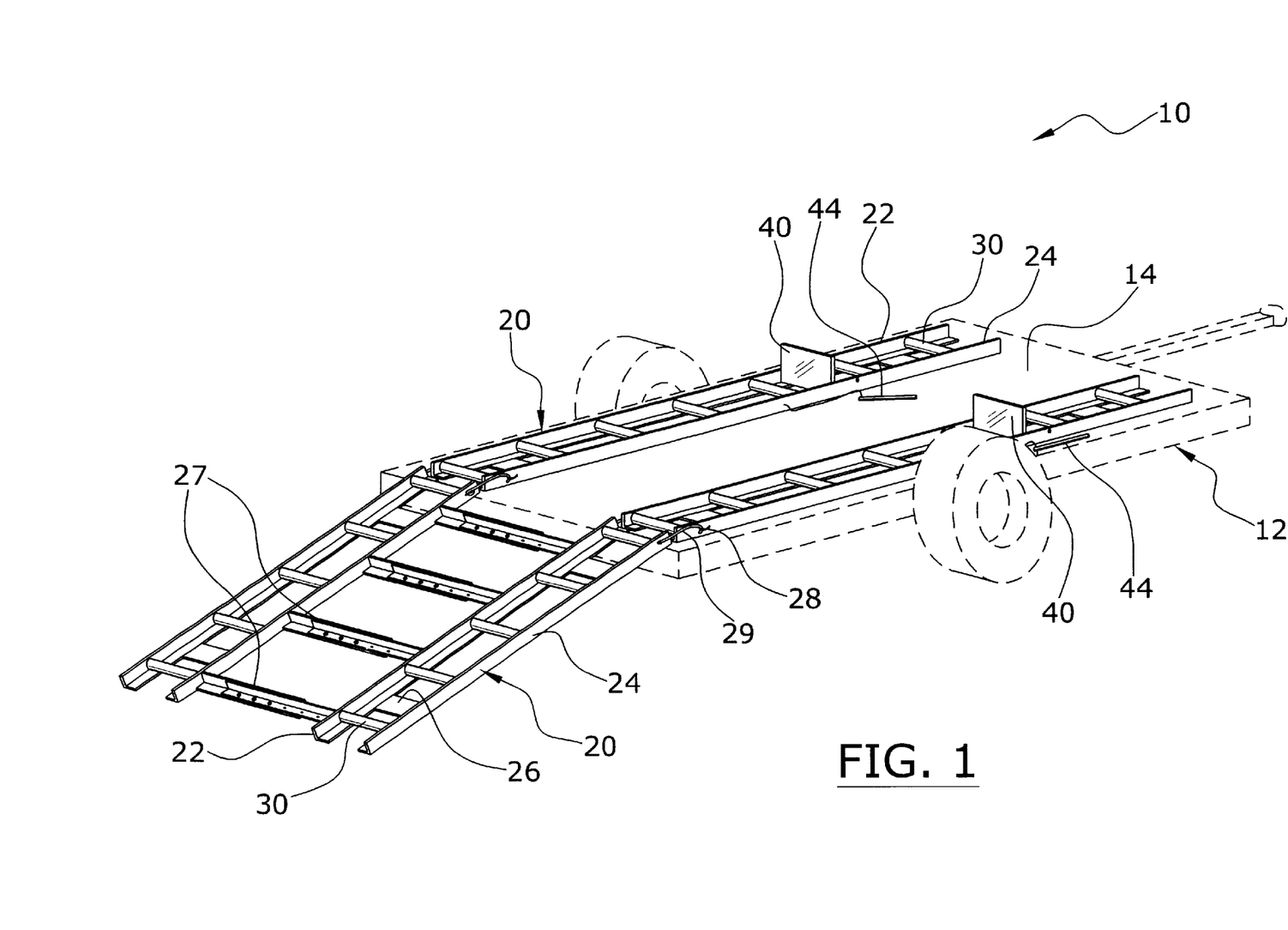
FIG. 1 is an upper perspective view of the present invention secured to the bed of a trailer and utilized as a loading ramp.

As shown in FIGS. 1 through 5 of the drawings, the elongate frame 20 is comprised of a rigid, straight and elongate structure. The elongate frame 20 may be comprised of various types of materials and structures. The elongate frame 20 is preferably comprised of aluminum because of the relatively lightweight advantages, however various other types of materials may be utilized for the elongate frame 20. The elongate frame 20 may have various lengths as can be appreciated. As shown in FIG. 1 of the drawings, a pair of elongate frames 20 may be attached to one another by a plurality of support members 27 extending between thereof. The support members 27 may be adjustable in length or non-adjustable in length.

The elongate frame 20 is preferably constructed of a first member 22 and a second member 24 substantially parallel to one another. The members 22, 24 may have various shapes and structure thereto. At least one cross member 26 preferably extends between the members 22, 24 for providing additional support to the elongate frame 20. The elongate frame 20 may be attached to the bed 14 of a trailer 12 or vehicle by conventional fasteners such as screws, bolts, nails and the like.

Figure 2:
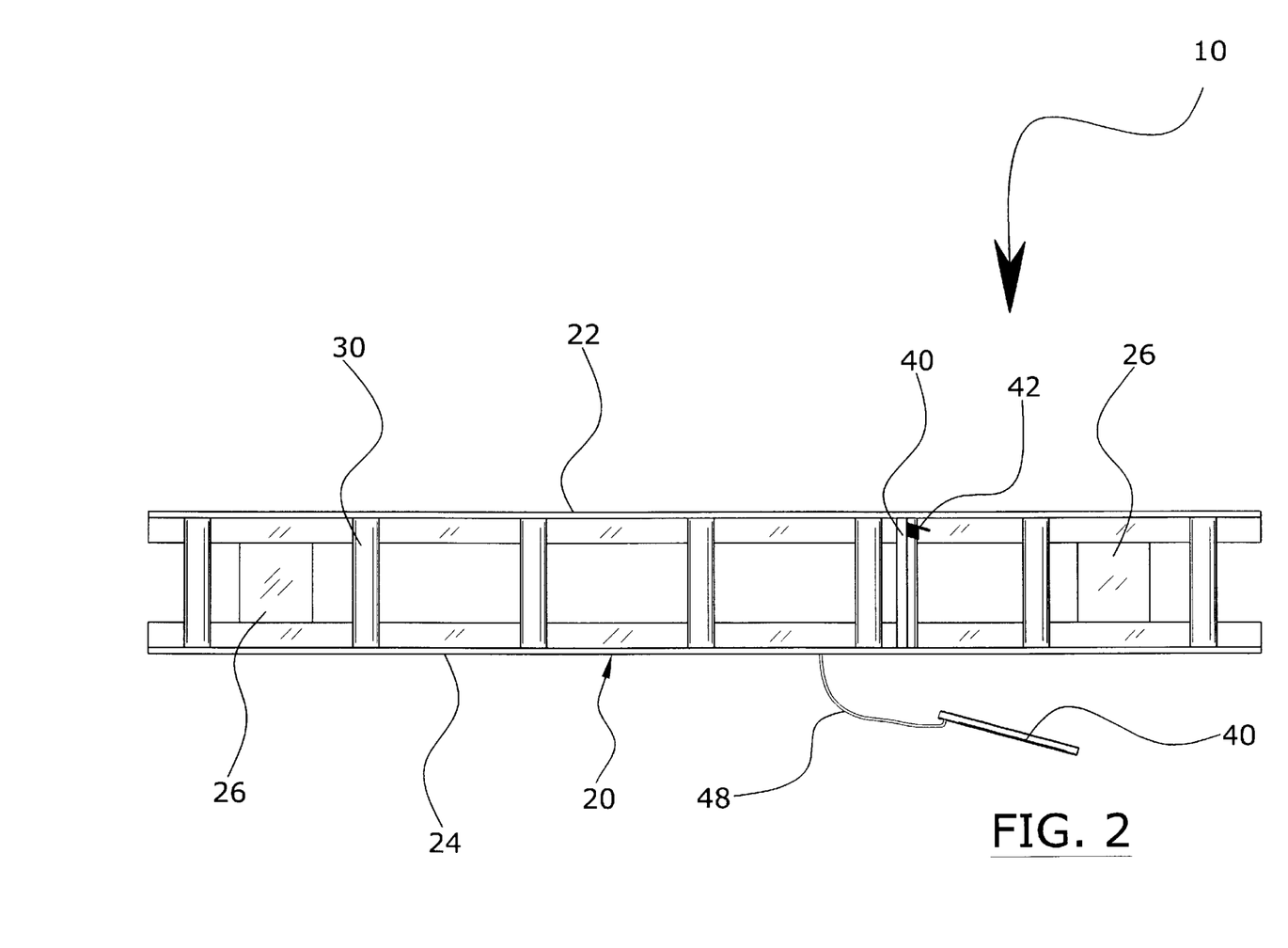
FIG. 2 is a top view of the present invention.

As shown in FIGS. 1, 2, 6 and 7 of the drawings, a plurality of rollers 30 are rotatably positioned between the members 22, 24 of the elongate frame 20. The plurality of rollers 30 have a rotational axis that is traverse to the longitudinal axis of the elongate frame 20 as best shown in FIG. 2 of the drawings.

The plurality of rollers 30 maybe comprised of various types of materials and structures as can be appreciated. The rollers 30 are preferably comprised of an outer material that does not damage the wear blades and skis 16 of the snowmobile such as plastic or rubber. The rollers 30 are constructed so as to support a portion of the weight of the snowmobile. In addition, the rollers 30 may have various widths and diameters which are suitable for receiving the ski 16 of the snowmobile. The rollers 30 may utilize bearings within for reducing the resistance of rollers 30 during the loading and unloading of the snowmobile from the trailer 12 or vehicle.

As shown in FIG. 2 of the drawings, the rollers 30 are preferably spaced apart in an equidistant manner upon the elongate frame 20. However, varying distances between the rollers 30 may be utilized depending upon the application of usage. In addition, the upper portion of the rollers 30 may be exposed above the upper edges of the members 22, 24, equal thereto or below thereof.

As shown in FIG. 1 of the drawings, a loop 28 may be attached to each of the members 22, 24 near an end thereof for assisting in the attachment of another elongate frame 20. A hook 29 is then attached to the other elongate frame 20 for selectively engaging the corresponding loop 28 as shown in FIG. 1 of the drawings. Various other attachment devices may be utilized for removably attaching a first elongate frame 20 to a second elongate frame 20.

Figure 3:
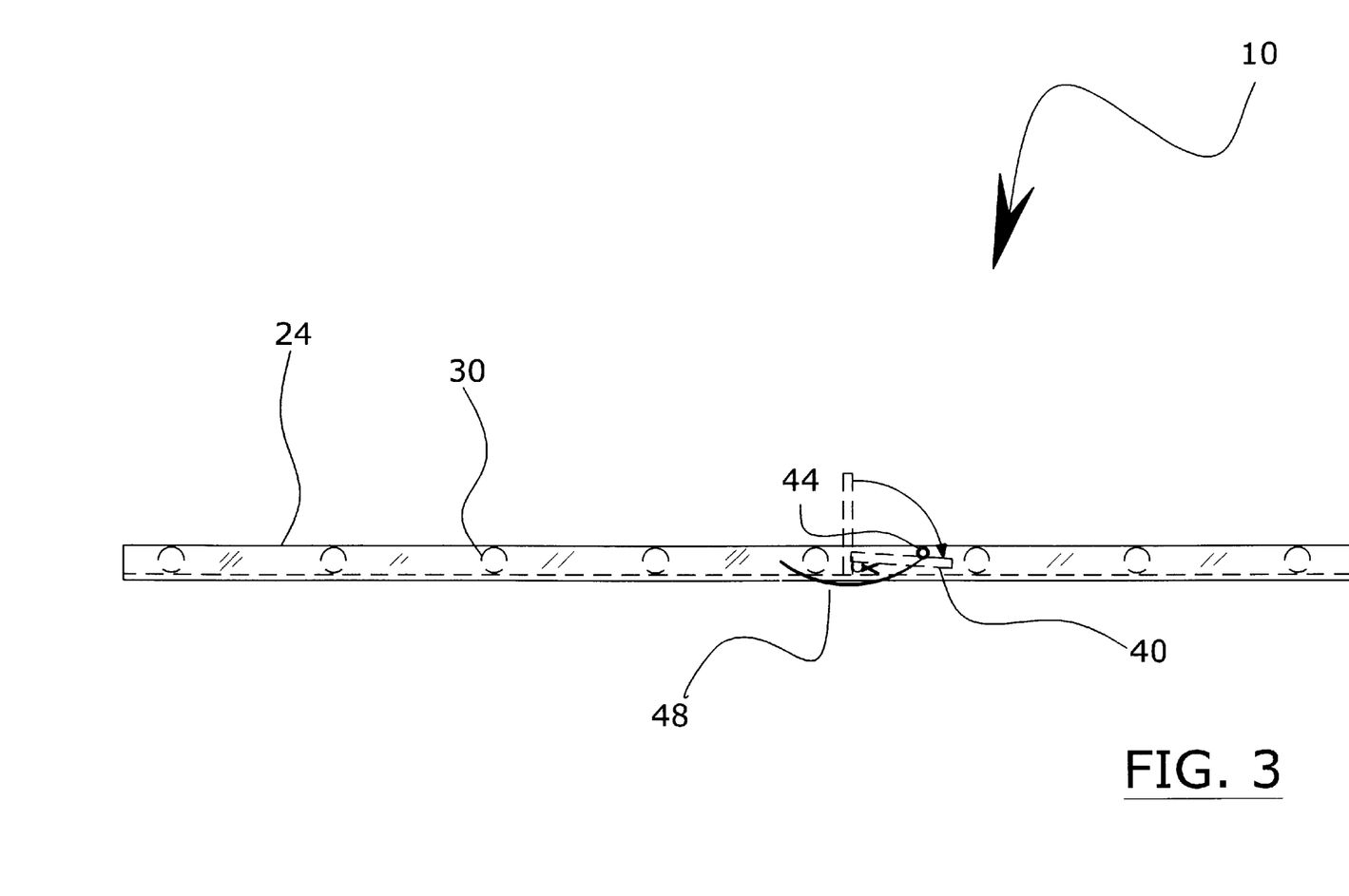
FIG. 3 is a side view of the present invention with the locking plate in the downward position.
Figure 4:
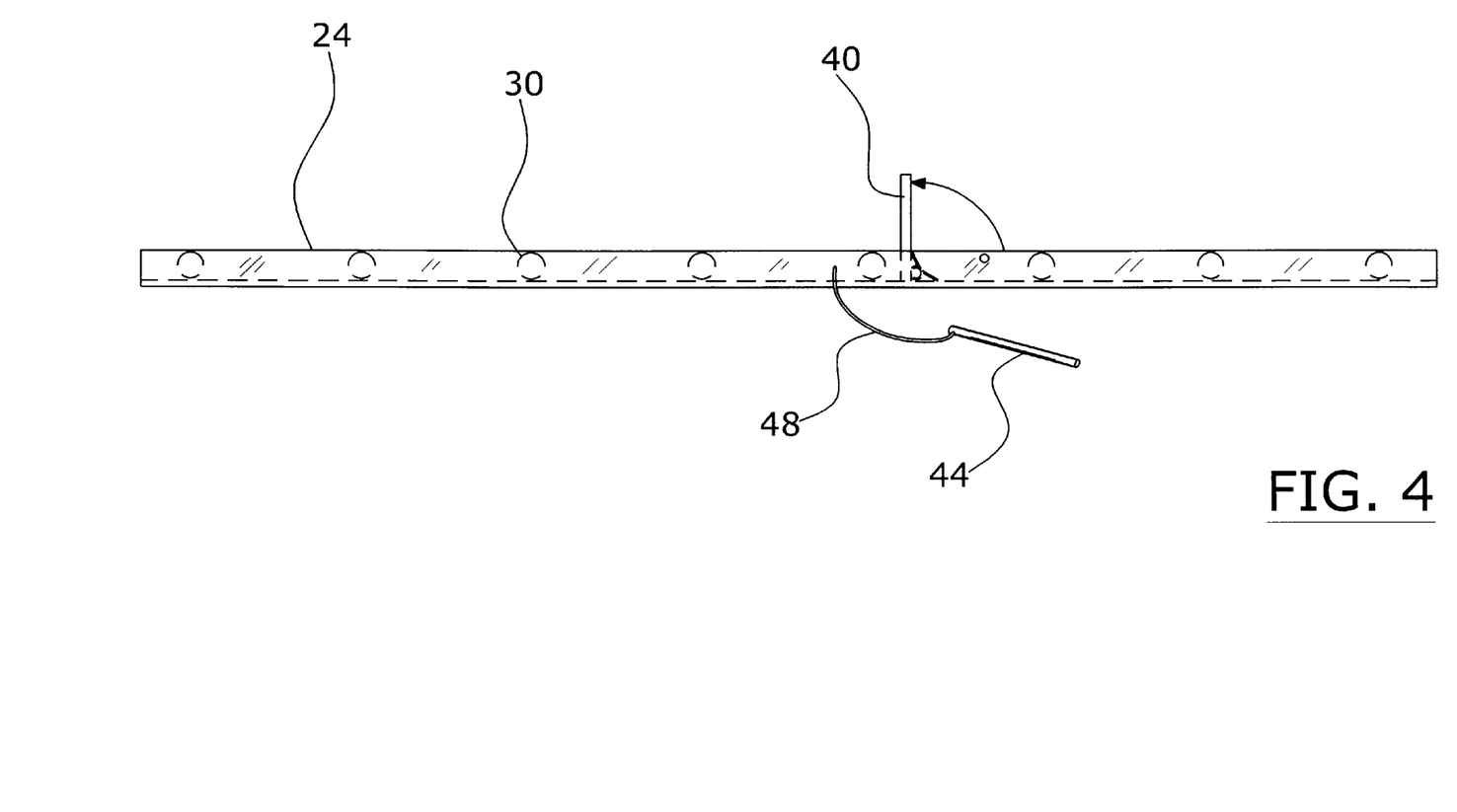
FIG. 4 is a side view of the present invention with the locking plate in the upward position.
Figure 5:
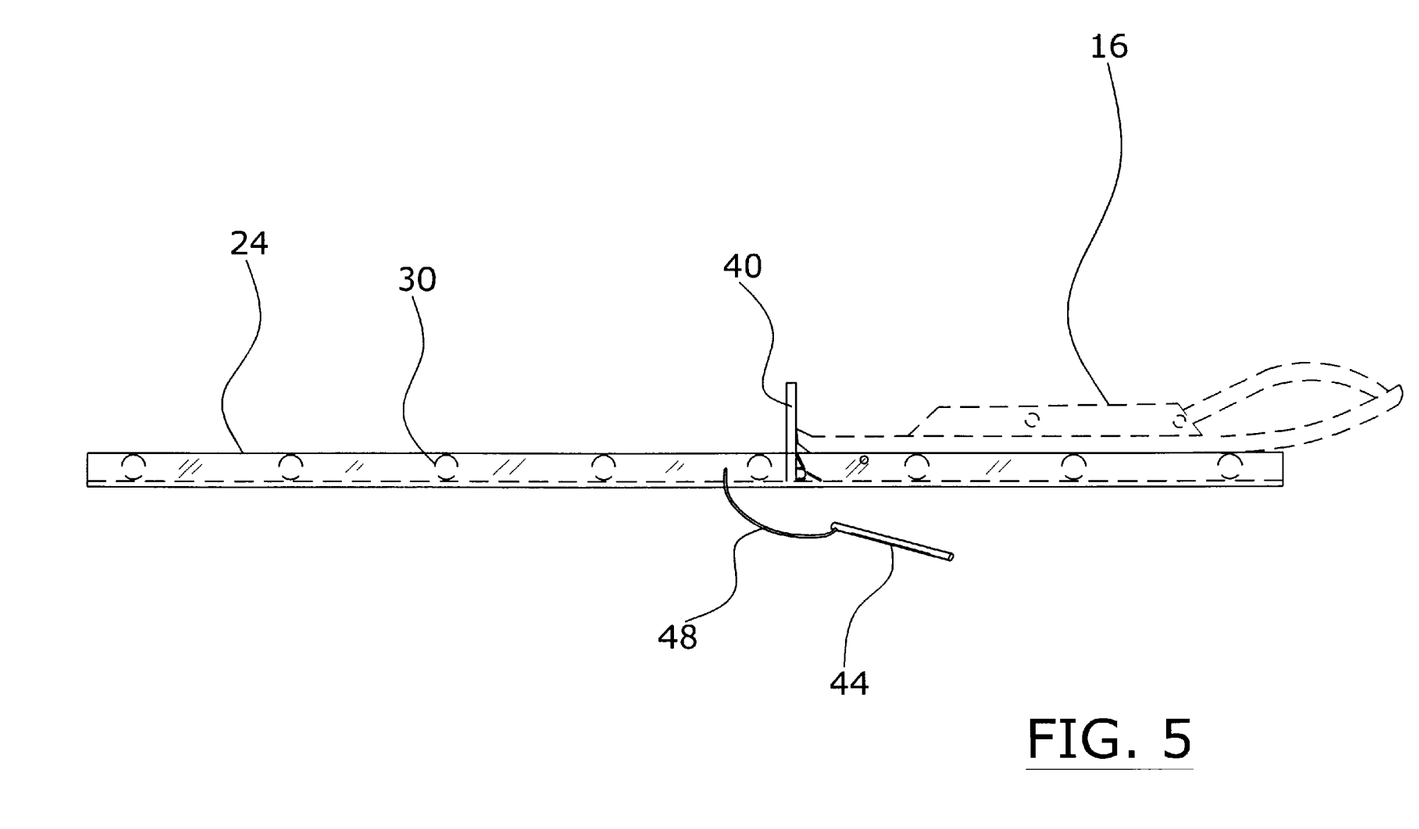
FIG. 5 is a side view of the present invention with the locking plate in the upward position with the ski locked forwardly with respect thereto.

As shown in FIGS. 1 through 7 of the drawings, a locking plate 40 is pivotally attached between the members 22, 24 of the elongate frame 20. The locking plate 40 is preferably a relatively broad structure and is capable of extending upwardly a finite distance to catch a rear end of a ski 16 as shown in FIG. 5 of the drawings. The locking plate 40 is preferably positioned adjacent to one of the rollers 30 as best illustrated in FIGS. 3 and 4 of the drawings.

Figure 6:
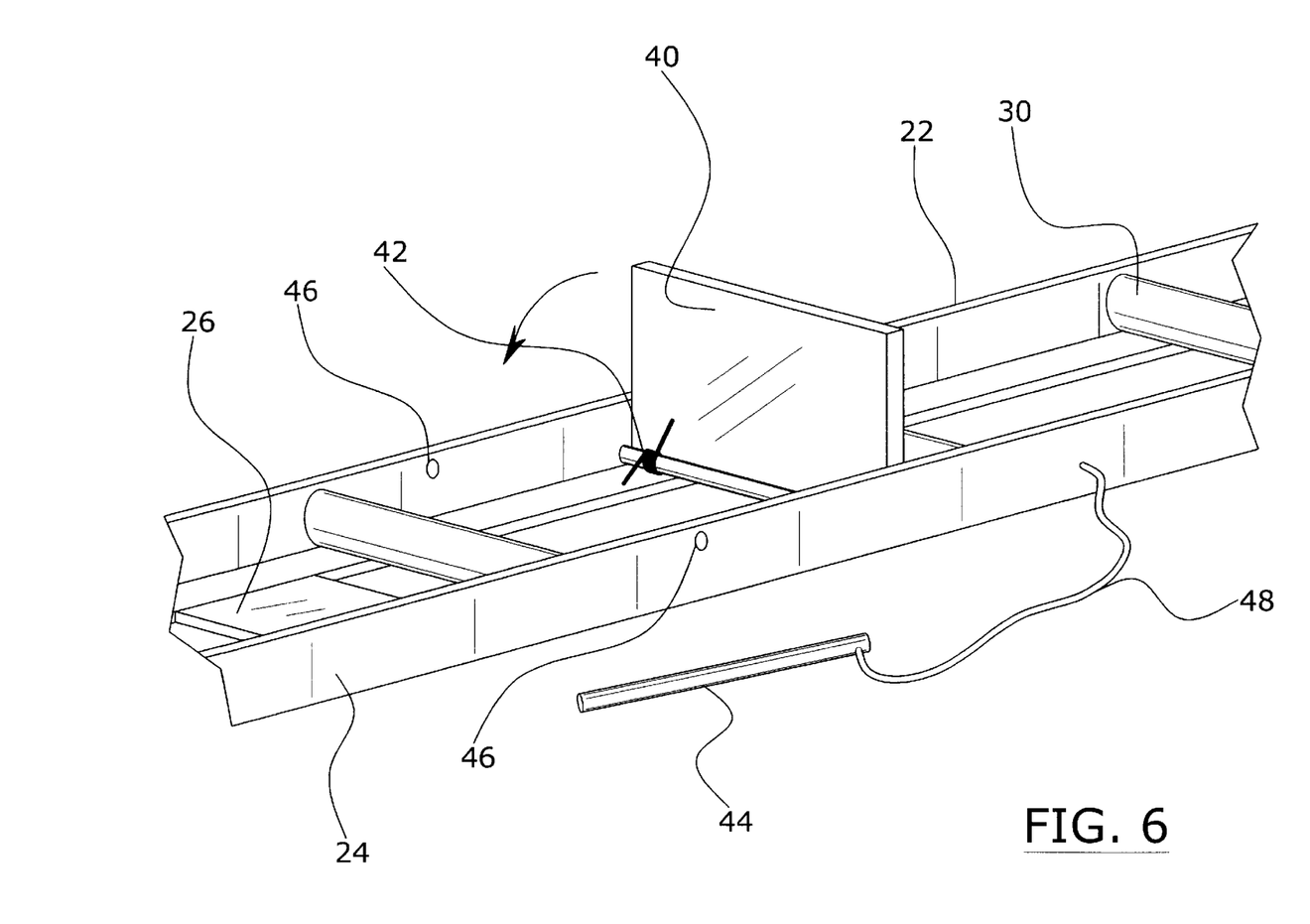
FIG. 6 is a magnified upper perspective view of the locking plate in the upward position.
Figure 7:
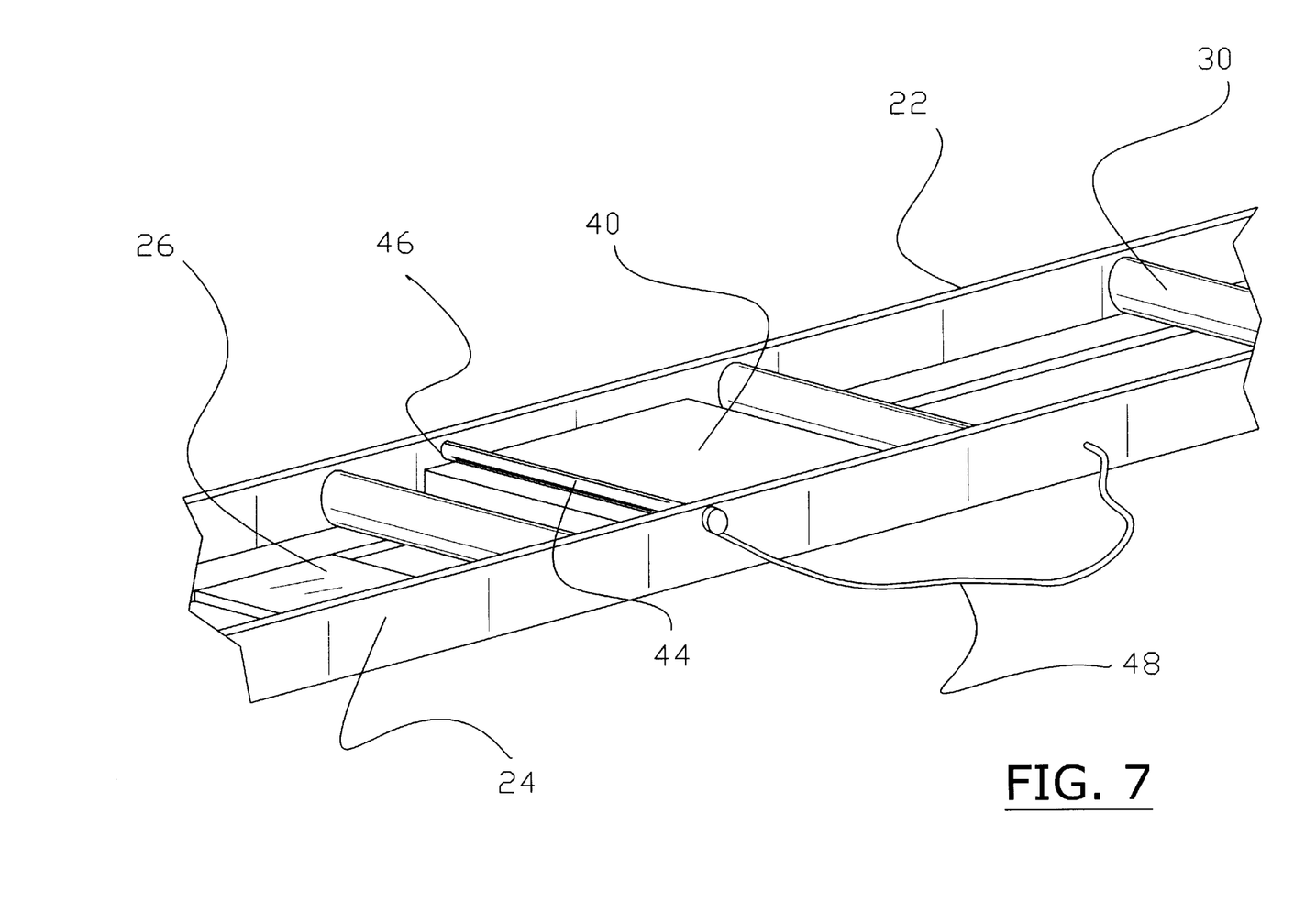
FIG. 7 is a magnified upper perspective view of the locking plate in the downward position with the locking pin retaining the locking plate.

A spring 42 is attached to the locking plate 40 and to the elongate frame 20 for applying an upward force to the locking plate 40 as best shown in FIG. 6 of the drawings. It can be appreciated that various other means for applying an upward force upon the locking plate 40 may be utilized for manipulating the locking plate 40 within the elongate frame 20.

As further shown in FIG. 6 of the drawings, an aperture 46 extends through the elongate frame 20 for receiving a locking pin 44 when the locking plate 40 is in the downward position. When the user desires to remove the snowmobile from the trailer 12 or vehicle, the user lowers the locking plate 40 and then secures the locking pin 44 within the aperture 46 thereby retaining the locking plate 40 below the upper portion of the rollers 30 which allows the ski 16 to pass rearwardly over the locking plate 40 without obstruction. A cable 48 or similar device is preferably attached to the locking pin 44 and the elongate frame 20 for reducing the chance of losing the locking pin 44.

In use, the user drives the snowmobile upon the present invention wherein the lower surface and the wear rods of the ski 16 engage the upper portion of the rollers 30 thereby allowing the snowmobile to be driven easily upon the trailer 12 or vehicle. As the snowmobile passes over the present invention, the front of the ski 16 engages the locking plate 40 and thereby forces the locking plate 40 forwardly and downwardly. After the ski 16 has passed over the locking plate 40, the locking plate 40 is forced upwardly by the spring 42 thereby preventing the ski 16 and the snowmobile from accidentally rolling rearwardly. The user then is able to secure the snowmobile to the trailer 12 or vehicle utilizing a conventional fastening means to prevent movement of the snowmobile upon thereof. When the user desires to unload the snowmobile, the user lowers the locking plate 40 and inserts the locking pin 44 into the aperture 46 thereby retaining the locking plate 40 in the downward position. The user then removes any other securing devices and then manipulates the snowmobile rearwardly wherein the ski 16 is able to roll upon the rollers 30 without obstruction by the locking plate 40. Once the snowmobile is removed, the user then removes the locking in preparation of the loading of the snowmobile at a later time.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A snowmobile loading system, comprising:
    an elongate frame having a first end, a second end and a longitudinal axis;
    a plurality of rollers rotatably positioned within said elongate frame, wherein a rotational axis of each of said plurality of rollers is substantially traverse to said longitudinal axis; and
    a locking plate pivotally attached within said elongate frame for selectively engaging a rear end of a ski of a snowmobile, wherein said locking plate has a downward position and an upward position.

2. The snowmobile loading system of claim 1, wherein said plurality of rollers are substantially parallel to one another.

3. The snowmobile loading system of claim 2, including a spring attached between said elongate frame and said locking plate for applying an upward force upon said locking plate.

4. The snowmobile loading system of claim 3, including an aperture within said elongate frame and a locking pin, wherein said locking pin is extendable within said aperture for retaining said locking plate in said downward position.

5. The snowmobile loading system of claim 4, including a cable attached to said locking pin and said elongate frame.

6. The snowmobile loading system of claim 5, wherein said elongate frame includes a first member and a second member comprised of an elongate structure.

7. The snowmobile loading system of claim 6, wherein said first member and said second member are parallel to one another.

8. The snowmobile loading, system of claim 7, including at least one cross member extending between said first member and said second member.

9. The snowmobile loading system of claim 8, wherein said locking plate is position adjacent to one of said plurality of rollers so as to prevent said locking plate from overextending when in said upward position.

10. The snowmobile loading system of claim 9, wherein said plurality of rollers are comprised of a resilient material.

11. A snowmobile loading system, comprising:
    an elongate frame having a first end, a second end and a longitudinal axis;
    a plurality of rollers rotatably positioned within said elongate frame, wherein a rotational axis of each of said plurality of rollers is substantially traverse to said longitudinal axis;
    a locking plate pivotally attached within said elongate frame for selectively engaging a rear end of a ski of a snowmobile, wherein said locking plate has a downward position and an upward position;
    at least one loop attached to said second end of said elongate frame; and
    at least one hook attached to said first end of said elongate frame for catchably engaging a loop from another elongate frame.

12. The snowmobile loading system of claim 11, wherein said plurality of rollers are substantially parallel to one another.

13. The snowmobile loading system of claim 12, including a spring attached between said elongate frame and said locking plate for applying an upward force upon said locking plate.

14. The snowmobile loading system of claim 13, including an aperture within said elongate frame and a locking pin, wherein said locking pin is extendable within said aperture for retaining said locking plate in said downward position.

15. The snowmobile loading system of claim 14, including a cable attached to said locking pin and said elongate frame.

16. The snowmobile loading system of claim 15, wherein said elongate frame includes a first member and a second member comprised of an elongate structure.

17. The snowmobile loading system of claim 16, wherein said first member and said second member are parallel to one another.

18. The snowmobile loading system of claim 17, including at least one cross member extending between said first member and said second member.

19. The snowmobile loading system of claim 18, wherein said locking plate is position adjacent to one of said plurality of rollers so as to prevent said locking plate from overextending when in said upward position.

20. The snowmobile loading system of claim 19, wherein said plurality of rollers are comprised of a resilient material.

* * * * *